(12) United States Patent
Amemiya et al.

(10) Patent No.: US 7,312,459 B2
(45) Date of Patent: Dec. 25, 2007

(54) APPARATUS FOR EVALUATING EUV LIGHT SOURCE, AND EVALUATION METHOD USING THE SAME

(75) Inventors: Mitsuaki Amemiya, Saitama-ken (JP); Akira Miyake, Tochigi-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 322 days.

(21) Appl. No.: 11/082,404

(22) Filed: Mar. 17, 2005

(65) Prior Publication Data

US 2007/0002474 A1    Jan. 4, 2007

(30) Foreign Application Priority Data

Mar. 18, 2004    (JP) .............................. 2004-078588

(51) Int. Cl.
G01J 1/42    (2006.01)
G21K 5/00    (2006.01)

(52) U.S. Cl. ........................... 250/372; 378/34; 378/35
(58) Field of Classification Search ................ 250/372; 378/34, 35, 119
See application file for complete search history.

(56) References Cited

U.S. PATENT DOCUMENTS

| | | | | |
|---|---|---|---|---|
| 6,198,793 B1 * | 3/2001 | Schultz et al. ................. | 378/34 | |
| 6,324,256 B1 | 11/2001 | McGregor et al. | | |
| 6,724,004 B2 * | 4/2004 | Yashiro ................... | 250/504 R | |
| 7,189,974 B2 * | 3/2007 | Kanazawa et al. ........... | 250/373 | |
| 2003/0146391 A1 * | 8/2003 | Kleinschmidt et al. ..... | 250/372 | |
| 2004/0188627 A1 * | 9/2004 | Panning ....................... | 250/372 | |
| 2004/0188628 A1 * | 9/2004 | Kanazawa et al. .......... | 250/372 | |
| 2005/0045829 A1 * | 3/2005 | Ito et al. ..................... | 250/372 | |
| 2006/0243712 A1 * | 11/2006 | Haight et al. .......... | 219/121.68 | |
| 2006/0243927 A1 * | 11/2006 | Tran et al. ............... | 250/504 R | |
| 2007/0012889 A1 * | 1/2007 | Sogard ................... | 250/504 R | |
| 2007/0080307 A1 * | 4/2007 | Bruijn et al. ............ | 250/504 R | |

FOREIGN PATENT DOCUMENTS

JP    2002-174700    6/2002

* cited by examiner

Primary Examiner—David Porta
Assistant Examiner—David S Baker
(74) Attorney, Agent, or Firm—Morgan & Finnegan LLP

(57) ABSTRACT

Disclosed is a measuring apparatus for measuring the position, size and/or shape of a light convergent point of an EUV light source. In one preferred form, the apparatus includes a light receiving device for receiving EUV light diverging from a light convergent point, an optical system for directing the EUV light toward the light receiving device, a light blocking member disposed in a portion of light path for the EUV light and having a plurality of openings, and a system for detecting a spatial distribution of the EUV light at the light convergent point, on the basis of reception of EUV light by the light receiving device. In another preferred from, the apparatus includes a light receiving device for receiving EUV light diverging from a light convergent point, a gas filter disposed in a portion of a light path of the EUV light and being filled with a predetermined gas, and a system for detecting a spatial distribution of the EUV light at the light convergent point, on the basis of the reception of EUV light by the light receiving device.

9 Claims, 11 Drawing Sheets

APPARATUS FOR EVALUATING EUV LIGHT SOURCE, AND EVALUATION METHOD USING THE SAME

FIELD OF THE INVENTION AND RELATED ART

This invention relates to an apparatus for evaluating EUV (extreme ultraviolet) light source and an evaluation method using the same. More particularly, the invention concerns an EUV light intensity distribution measuring apparatus and an EUV light intensity distribution measuring method to be used in such apparatus, for performing evaluation of an EUV light source used in a projection exposure apparatus, for example.

Conventionally, production of fine semiconductor devices such as semiconductor memories or logic circuits uses a printing (lithographic) process which is based on reduction projection exposure using ultraviolet rays. The smallest size that can be transferred by the reduction projection exposure is proportional to the wavelength of light used and it is inversely proportional to the numerical aperture of the projection optical system. Hence, in order to enable transfer of very fine circuit patterns, the wavelength of light to be used has been shortened more and more, such as from Hg lamp i-line (wavelength 365 nm) to KrF excimer laser (wavelength 248 nm) and then to ArF excimer laser (wavelength 193 nm), for example.

However, semiconductor devices are being extremely decreased in size, and there is a limit in the lithography using ultraviolet light described above. In order to enable efficient printing of an extraordinarily fine circuit pattern less than 0.1 µm, reduction projection exposure apparatuses using extreme ultraviolet (EUV) light of a wavelength of about 10-15 nm, much shorter than the ultraviolet rays, are being developed. FIG. 11 illustrates such EUV exposure apparatus.

As shown in FIG. 11, the exposure apparatus comprises an exciting pulse laser 101, a condensing lens 102 and a target supplying device 103. Denoted at 104 is plasma, and denoted at VC is a vacuum container. The container VC accommodates therein the following components: that is, illumination system first mirror 105, optical integrator 106, illumination system second mirror 107, view angle controlling aperture 108, illumination system third mirror 109, alignment detecting optical system 110, autofocus detecting optical system 111, reticle stage RS, reticle chuck RC, reticle R, projection system first mirror 112, projection system second mirror 113, projection system third mirror 114, opening controlling aperture 115, projection system fourth mirror 116, alignment detecting optical system 117, focus detecting optical system 118, wafer stage WS, wafer chuck WC, wafer W, and so on.

In parallel to the development of this type of reduction projection exposure apparatuses, EUV light sources to be used with such apparatuses have been developed. An example is a laser plasma light source such as disclosed in Japanese Laid-Open Patent Application, Publication No. 2002-174700, corresponding to U.S. Pat. No. 6,324,256. This light source is arranged so that pulse laser of high intensity is projected on a target material placed inside a vacuum container to produce high-temperature plasma. The plasma functions as a light emission point from which EUV light of a wavelength of about 13 nm, for example, is emitted. As regards the target material, metal thin film, inactive gas or liquid drops are usable. The target material is supplied into the vacuum container by means of gas jet, for example. In order to assure that the EUV light emitted from the target has higher average intensity, the repetition frequency of the pulse laser should be made higher and, usually, the laser is operated at a repetition frequency of a few kHz.

Optical elements are used to ensure efficient utilization of EUV light produced from the target. As regards the optical elements that constitute an exposure apparatus using EUV light, mainly they are oblique-incidence total reflection mirrors and also multilayered film mirrors made of silicon and molybdenum, as mirrors having an incidence angle close to normal incidence. Such normal incidence multilayered film mirror has high reflectance with respect to EUV light of 13.5 nm wavelength. Thus, among the light rays emitted from the EUV light source, EUV light in a range from 13.365 nm to 13.635 nm about the wavelength 13.5 nm can be used as a consequence, during the projection exposure process. The EUV light from the light emission point is collected by a collecting mirror at a light convergent point and, after subsequently diverging from the light convergent point, it is introduced into the projection exposure apparatus. Then, through an illumination optical system of the projection exposure apparatus, it illuminates a mask uniformly.

Uniformly illuminating the mask is very important for the performance of the projection exposure apparatus such as resolving power, for example. To assure this, the light convergent point (spot) should desirably be formed at a predetermined position and with a certain extension not larger than a predetermined size, and also the EUV light should desirably be diverged from the light convergent point with good symmetry. However, due to various factors such as the shape of the plasma, the gas density distribution inside the vacuum container, and the shape of collecting mirror used, for example, the EUV light diverging from the light convergent point is not always idealistic. Therefore, it is desirable to detect the position, size, shape and the like of the light convergent point of a used EUV light source and to correct it by use of an illumination optical system.

In order to measure the position, size, shape and the like of a light convergent point, it is necessary to measure the intensity distribution inside an image that is formed by imaging the EUV light from a light convergent point through an optical system. An example of such an imaging optical system for imaging the EUV light having short wavelength is a Schwarzschild optics which is constituted by use of multilayered-film mirrors.

However, the following inconveniences are present in relation to measurement of the intensity distribution of an image as imaged by use of an imaging optical system having multilayered-film mirrors.

The intensity of EUV light generally required as EUV light source is only about 100 W. However, since the EUV light source contains light rays of wavelength regions such as visible light or infrared rays which are basically unnecessary for the exposure process, the quantity of light that actually passes the light convergent point and enters the imaging optical system becomes more than 1 kW.

On the other hand, the multilayered film mirror of the imaging optical system is designed so as to reflect only the wavelength region that is necessary for the EUV light exposure. Therefore, much of energies incident on the mirror is absorbed by the mirror and it heats the mirror. The optical system for EUV light is placed in a vacuum and, furthermore, direct water cooling is very difficult because of vibration. Thus, it is practically difficult to cool the mirror efficiently.

As a result, the temperature of the multilayered film mirror rises, and resultant thermal deformation causes an error in shape. Furthermore, the structure of the multilayered film may be destroyed, causing decrease of reflectance.

On the other hand, there is another problem. While CCD or the like may be used as a detector for measuring the intensity distribution of an image, being imaged through an imaging optical system, if the intensity of light impinging on the detector is too large, the output of the detector will be saturated. Accurate measurement is unattainable in such occasion.

Such a problem may be solved by using a filter for attenuating the light quantity. However, in order that a metal thin film can be used as a filter, for example, it should be made with a thickness of about a few microns. With such thickness, the film may be easily fused by heat or the filter may have non-uniform transmittance. For these reasons, it is very difficult to use such filter practically in the measurement.

SUMMARY OF THE INVENTION

It is accordingly an object of the present invention to provide a measuring apparatus by which the position, size and/or shape of a light convergent point of an EUV light source can be measured precisely.

It is another object of the present invention to provide a measuring method that uses the measuring apparatus described above.

In accordance with an aspect of the present invention, there is provided a measuring apparatus, comprising: light receiving means for receiving EUV light diverging from a light convergent point; an optical system for directing the EUV light toward said light receiving means; a light blocking member disposed in a portion of light path for the EUV light and having a plurality of openings; and means for detecting a spatial distribution of the EUV light at the light convergent point, on the basis of reception of EUV light by said light receiving means.

In accordance with another aspect of the present invention, there is provided a measuring apparatus, comprising: light receiving means for receiving EUV light diverging from a light convergent point; a gas filter disposed in a portion of a light path of the EUV light and being filled with a predetermined gas; and means for detecting a spatial distribution of the EUV light at the light convergent point, on the basis of the reception of EUV light by said light receiving means.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
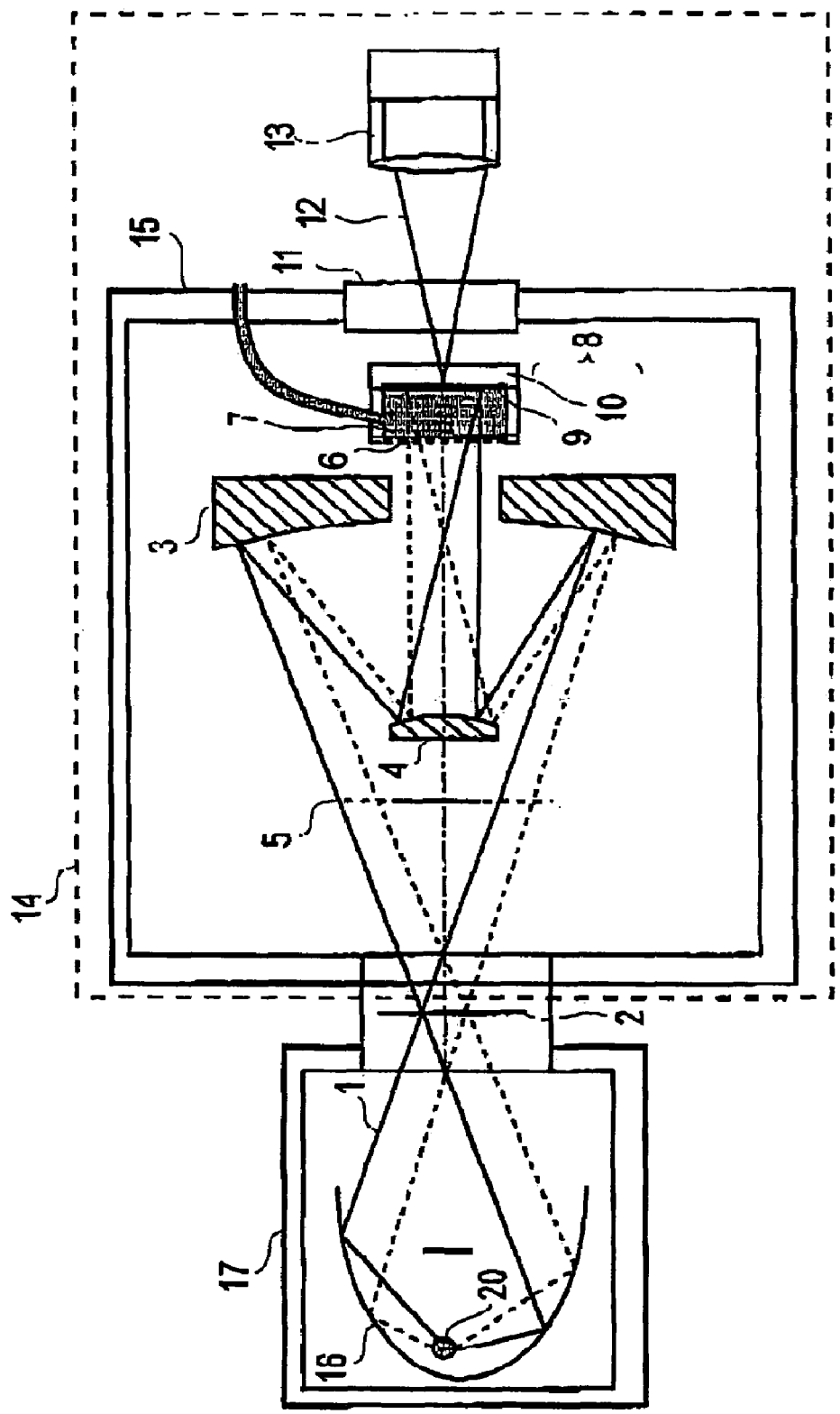
FIG. 1 is a schematic view of a measuring apparatus 14 according to a first embodiment of the present invention, for measuring a spatial distribution of a light convergent point of an EUV light source.

FIG. 1 shows a measuring apparatus 14 according to a first embodiment of the present invention, for measuring a spatial distribution, such as position, size, shape and the like, of a light convergent point of an EUV light source. FIG. 1 illustrates the measuring apparatus 14 in the state in which it is mounted to an EUV light source 17 to be measured.

The EUV light source 17 projects pulse laser light upon a target material by which, or by exciting gas molecules through electric discharging, plasma that emits light rays 1 including EUV light is produced at a light emission point 20. A light collecting mirror 16 comprising a rotational ellipsoid mirror is disposed with its one foal point placed at or adjacent the position of the light emission point 20, and it functions to collect the light rays 1, emitted from the light emission point 20, to and at the position of another focal point thereof. In FIG. 1, the position of a light convergent point 2 corresponds to one focal point position of the light collecting mirror 16. The light rays 1 collected at the light convergent point 2 diverge therefrom while taking the light convergent point as a secondary light source. Where the light rays are to be used for exposure, the light rays are directed to an illumination optical system of an exposure machine.

Where the EUV light source is used as an exposure light source, it is desirable that the light convergent point 2 is exactly defined at a predetermined position and it has symmetrical intensity distribution, such that a symmetrical intensity distribution is produced within a divergent angle from the light convergent point 2. Furthermore, in order to suppress various aberrations at the illumination optical system of the exposure machine, it is desirable that the size of the light convergent point should be kept at not greater than a predetermined level.

However, since the light convergent point 20 is defined by plasma which can be produced in various ways as described above, the position, size, and distribution and so on of the light convergent point can not always be idealistic. Furthermore, since the light convergent point 2 is defined by imaging the light emission point 20 by means of the light collecting mirror 16, any errors in shape of the light collecting mirror 16 or a distribution of reflectance thereof may cause variation in spatial distribution such as position, size or distribution. Taking theses factors into consideration, it would be readily understood that, for satisfactory exposure, it is very important to measure the position, size or distribution of an actual light convergent point by use of the measuring apparatus 14 of the present invention, to assure a predetermined condition.

The measuring apparatus 14 of the present invention which is a spatial distribution evaluation apparatus for the light convergent point 2, comprises a Schwarzschild optics including a first mirror (concave mirror) 3 and a second mirror (convex mirror) 4 that functions to image, with enlargement, the light rays 1 diverging from the light convergent point 2, upon a screen 8. Here, the first and second mirrors 3 and 4 comprise a multilayered film mirror having been formed by providing a multilayered film by vapor deposition upon the surface of a substrate being formed into concave shape or convex shape. An example of multilayered film mirror to be used with EUV light of a wavelength of about 13.5 nm is one having alternate layers of Mo and Si and being designed to reflect EUV light of wavelengths in a range of ±0.5 nm about a peak wavelength 13.5 nm. Where the interface between Mo and Si is rough, a buffering material effective to reduce the surface roughness may be provided between Mo and Si. An example of such buffering material may be $B_4C$.

The EUV light which is the object of measurement can be attenuated largely by gas molecules. It is therefore desirable to keep a vacuum ambience inside a chamber 15 in which the light path of EUV light is defined.

In this embodiment, the screen 8 comprises a glass substrate 10 having a fluorescent substance 9 formed thereon. The EUV light absorbed by the fluorescent substance 9 is converted into fluorescent light which is visible light having a wavelength peculiar to the fluorescent substance. By imaging it upon a CCD 13 placed in an atmosphere, through the glass substrate and a view port 11 which is a vacuum window, an image of the light convergent point can be measured. Alternatively, a CCD may be directly disposed as a screen 8 to observe the EUV light.

In this embodiment, a light attenuating plate 5 is inserted between the light convergent point 2 and the first mirror 3, while a gas filter 7 is interposed between the second mirror 4 and the screen 8.

Figure 2:
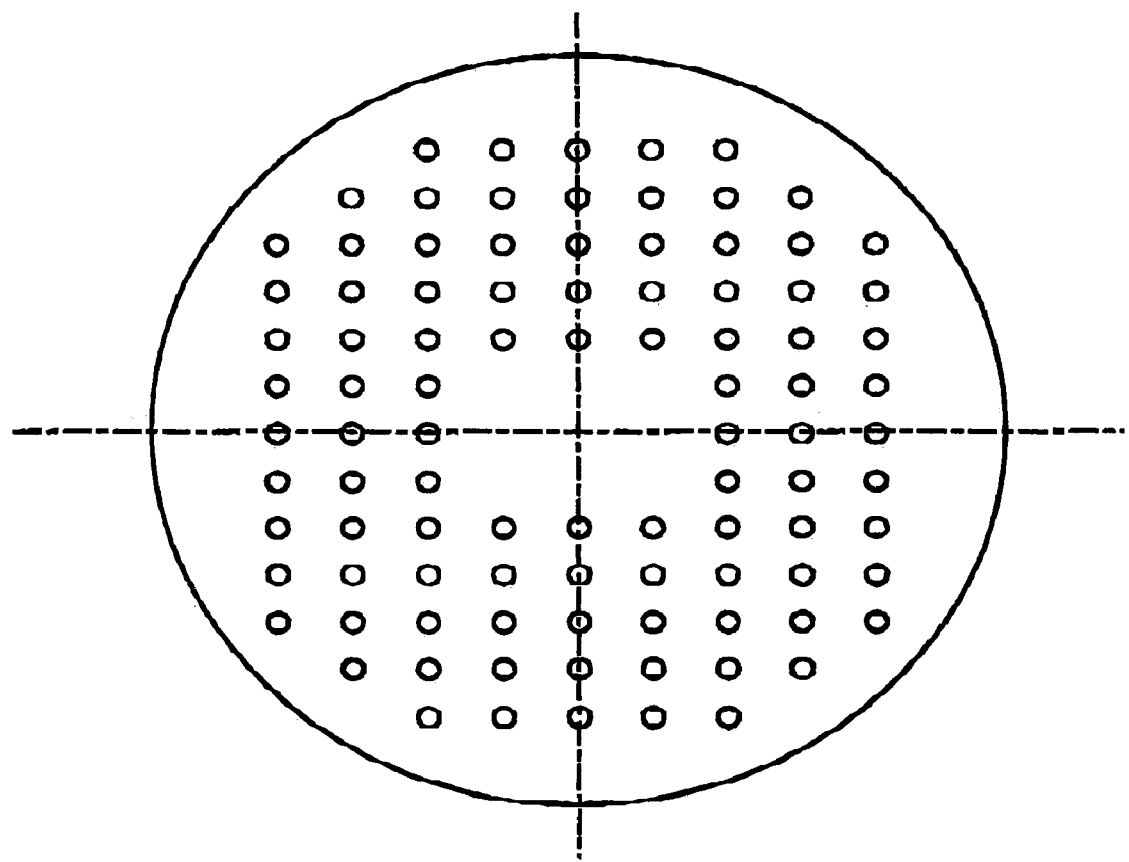
FIG. 2 shows an example of a shape of openings formed in a light attenuating plate 5.
Figure 3:
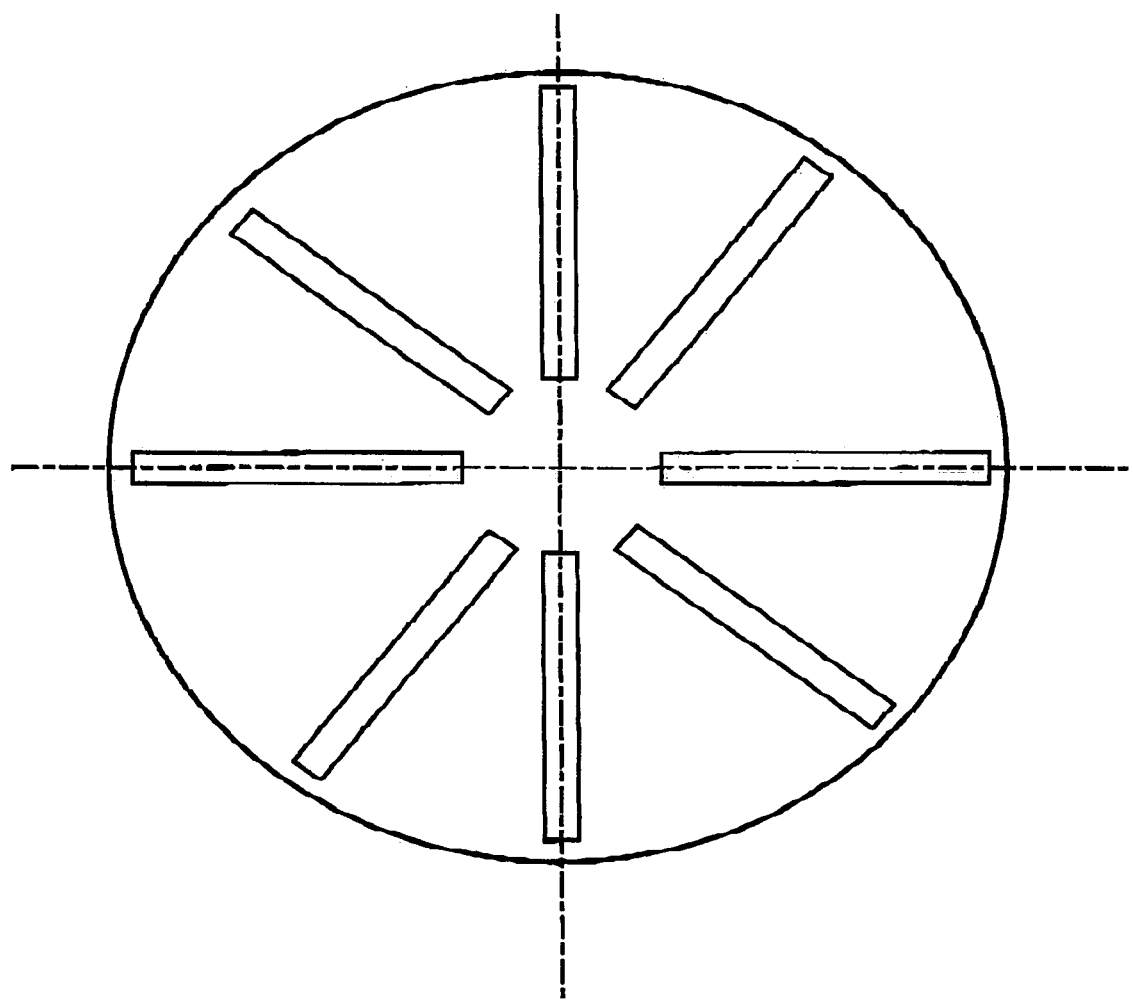
FIG. 3 shows another example of a shape of openings formed in a light attenuating plate 5.

FIGS. 2 and 3 illustrate the shapes of openings that can be formed in the light attenuating plate 5. The light attenuating plate 5 may desirably be provided by forming pinhole-like openings (FIG. 2) or slit-like openings (FIG. 3) in a light-blocking plate effective to intercept light. Particularly, where the light rays diverging from the light convergent point 2 have an intensity distribution of circular shape at the position of the light attenuating plate 5, use of pinhole-like openings shown in FIG. 2 will be appropriate. If the intensity distribution has a ring-like shape, use of slit-like openings shown in FIG. 3 will be appropriate. The light attenuating plate should desirably be disposed at a position that can not be image upon the screen 8. Particularly, in order to assure that the intensity distribution within the light convergent point does not change regardless of use of the light attenuating plate and that the light rays emitted from each positions are attenuated uniformly, the light attenuating plate should desirably be disposed on a pupil plane of the optical system inside of the measuring apparatus 14.

As regards the width or diameter d of the openings of the light attenuating plate 5, when the distance between the light convergent point and the openings of the light attenuating plate 5 is denoted by L, the wavelength is denoted by λ, and a desired resolving power is denoted by R, from the Rayleigh limit there is a relation R=0.61λ/(0.5 d/L) and, hence, any decreases of the resolving power due to the openings of the light attenuating plate 5 can be avoided if relation (1) below is satisfied.

$$d > 1.22 \cdot \lambda \cdot L/R \quad (1)$$

Particularly, where any changes of the centroid position of the light convergent point 2 should be measured, it will be enough that the resolving power R is about ⅕ of the diameter D of the light convergent point. Hence, a width d satisfying relation (2) below will be sufficient.

$$d > 6.1 \cdot \lambda \cdot L/D \quad (2)$$

For example, when the light attenuating plate 5 is placed at a position of 150 mm from the light convergent point, if the EUV light to be measured has a wavelength 13.5 nm and the resolving power required is 0.1 mm, a diameter of the openings not less than 25 μm will be enough. In this embodiment, openings of a diameter 100 μm are formed with a pitch 2 mm, and thus an attenuation rate of 0.002× is accomplished without a decrease of resolving power.

By using a light attenuating plate 5 having a predetermined opening as light attenuating means as described above, a desired attenuation rate can be accomplished. Furthermore, as compared with a case where a thin film filter is used, a thick plate having better heat conductivity can be used, yet the attenuation rate distribution along the surface can be made more uniform.

Figure 4:
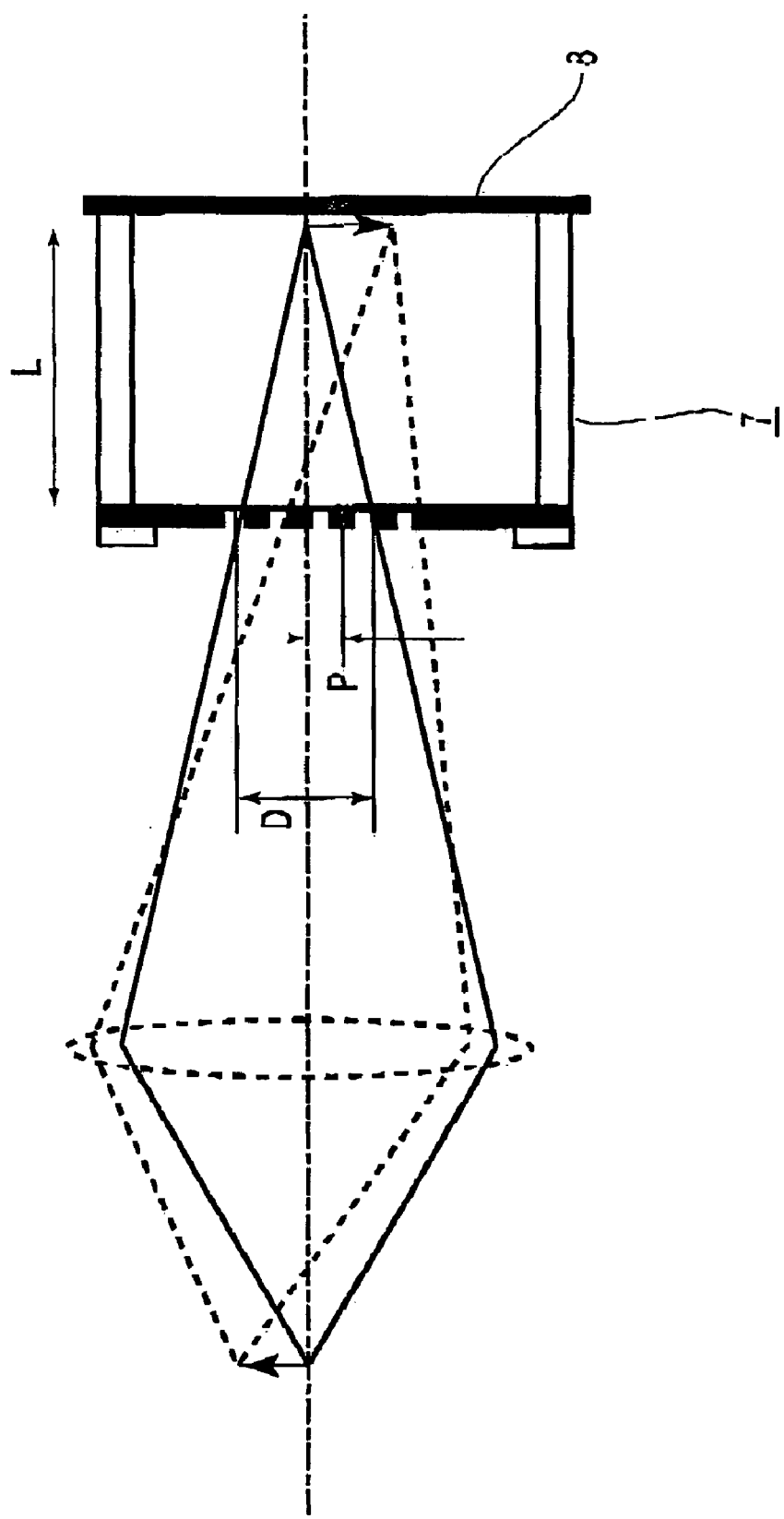
FIG. 4 is a schematic view of the structure of a gas filter 7.

FIG. 4 illustrates the structure of the gas filter 7. The light entrance side of the gas filter 7 is defined by a thin film being transmissive to EUV light. The opposite side of the gas filter is defined by the screen 8. The inside space may be filled with Xe gas, for example, and EUV light can be attenuated thereby. The inside pressure of the gas filter 7 is controlled by pressure controlling means (not shown) connected to the gas filter 7 through a gas supplying tube. In this embodiment, the gas filter 7 and the screen 8 are made integral. However, they may be provided separately. In that occasion, in place of the screen 8, a window being transmissive to EUV light may be provided at the light exit side to gas-tightly keep the gas inside the filter.

Figure 5:
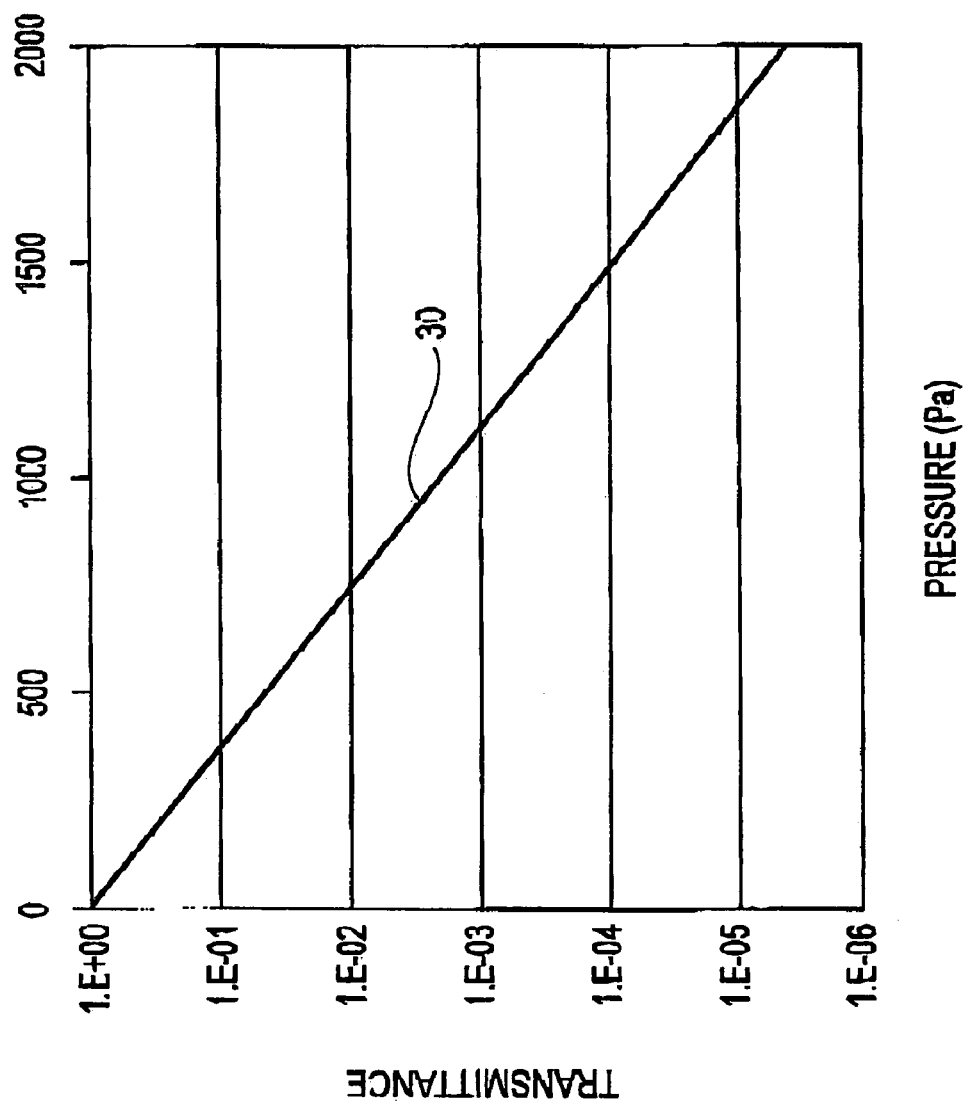
FIG. 5 is a graph for explaining the relationship between the gas pressure of Xe and the transmittance of light of 13.5 nm (optical path length is 50 mm).

FIG. 5 illustrates the relationship (line 30) between the Xe gas pressure and the transmittance of light of 13.5 nm under a condition that the temperature is 300K and the optical path length in the gas is 50 mm. It is seen from FIG. 5 that, under a constant temperature, by controlling the gas pressure, the intensity of light transmitted can be attenuated from one-digit level to six-digit level. Since the transmittance is a function of number density, if the temperature is variable, the control may be carried out to the pressure P and the temperature T to maintain P/T at a predetermined value.

The gas filter 7 should have a window for gas-tightly keeping a gas in the filter. Since such window should have a function for transmitting EUV light at a predetermined transmittance, it would be necessary to provide such window by use of a thin film. If the gas filter pressure increases, therefore, the window will be flexed by the gas pressure. This means that the transmittance becomes different depending on the position where the light ray passes. In order to avoid this, a thin film being supported by a mesh structure provided by a matrix-like frame may be used as the gas filter window. In that occasion, in order to avoid that the shadow of the supporting mesh causes non-uniformness of the intensity upon the screen, the supporting mesh should desirably be placed at a predetermined distance or more away from the screen.

The distance L2 with which the shadow of the mesh when projected on the screen 8 would not cause any inconveniences can be determined as follows. The condition for the distance L2 ensuring that the distance D through which the light ray slices on the mesh is 10 times larger or more of the pitch P of the mesh can be expressed by relation (3) below, if the numerical aperture of the optical system is NA and the magnification is M.

$$L2 > 5 \cdot p \cdot M/NA \quad (3)$$

With the provision of a gas filter window 6 with mesh as described above, a sufficient number of mesh frames can be present both in the path of a light ray emitted from a point A and in the path of a light ray emitted from another point B. It is assured therefore that the supporting mesh does not cause non-uniform intensity on the screen 8.

As an example of combination of a window 6 and a supporting mesh, a window 6 may be provided by using a Zr thin film of 0.2 μm thickness, effective to transmit 13.5 nm light by 50%, and it may be supported by a supporting mesh consisting of a grid-like Ni frame having 30 μm thickness. The mesh may have a pitch 0.3 mm. When an optical system having a NA=0.1 and a magnification 2.5× is used, it is seen from the relation (3) above that the shadow of the mesh is not observed upon the screen 8 if the distance L2 from the window 6 to the screen 8 is made not shorter than 37.5 mm.

Furthermore, by controlling the gas (Xe) pressure inside the gas filter 7 in a range from 0 Pa to 1500 Pa, the transmittance can be controlled within a range from 0.5 to 0.0001. Here, it should be noted that the Zr film serves to completely block visible light. Thus, it functions also as a visible light removing filter.

Where a thin film filter is used, non-uniformness of its thickness may cause a difference in the transmittance of EUV light. In the case of Zr filter, for example, a thickness non-uniformness of ±0.1 μm may cause ±30% non-uniformness of transmittance. Like the case of the mesh support, if much film thickness irregularity is present at the position where the light rays to be incident on a single point on the screen cross the thin film filter, the intensity non-uniformness due to the film thickness non-uniformness is not observed upon the screen. The positional relationship between the thin film filter and the screen corresponds to the product of equation (3) multiplied by the non-uniformness of transmittance. If the pitch of non-uniformness is p, the numerical aperture of the optical system is NA, the magnification is M, the distance from the filter to the screen is L3, the average period of the transmittance non-uniformness is PV, the thin film filter may be disposed at a position that satisfies relation (4) below and, in that occasion, non-uniformness of intensity due to the film thickness non-uniformness is never observed upon the screen.

$$L3 > 5 \cdot p \cdot PV^* M/NA \quad (4)$$

As an alternative, the thin film filter may be disposed between the mirror and the light convergent point. In that occasion, M=1 may be chosen and the filter may be disposed at a position that satisfies relation (5) below.

$$L3 > 5 \cdot p \cdot PV/NA \quad (5)$$

If the temperature rise of the thin film filter is a problem to be considered, a thin film being supported by a grid-like supporting mesh having a thickness of tens microns and a pitch of hundreds microns may be used. In that occasion, the heats can be released through the supporting mesh to the frame member of the supporting mesh. Thus, temperature rise of the thin film can be prevented. In that occasion, in order to assure that the shadow of the supporting mesh from is not projected on the screen, the thin film filter may be disposed at a position that satisfies the relation (3) mentioned above. Furthermore, by circulating a gas through the gas filter 7, the heat of the window can be removed efficiently.

As regards the light attenuating plate 5, the gas filter 7, the window 6 of the gas filter 7, and the mesh support for it, the structures described above are not the sole example. They may be modified appropriately to provide different transmittance. Furthermore, the position for the light attenuating plate 5 and the gas filter 7 is not limited to those described above. The position may be determined appropriately while taking into account the light intensity at various positions along the light path, for example.

By us of the light attenuating plate 5, the intensity of light rays impinging on the first and second mirrors 3 and 4 can be made sufficiently small, and thus unwanted damage of the mirrors can be avoided effectively. Furthermore, by use of the gas filter 7, a transmittance to be harmonized with the intensity sensor, provided on the screen 8, can be realized.

While this embodiment has been described with reference to an example wherein Schwarzschild optics is used as an imaging optical system, the imaging optical system may be an eccentric or decentered optical system having a reflection mirror.

Embodiment 2

Figure 6:
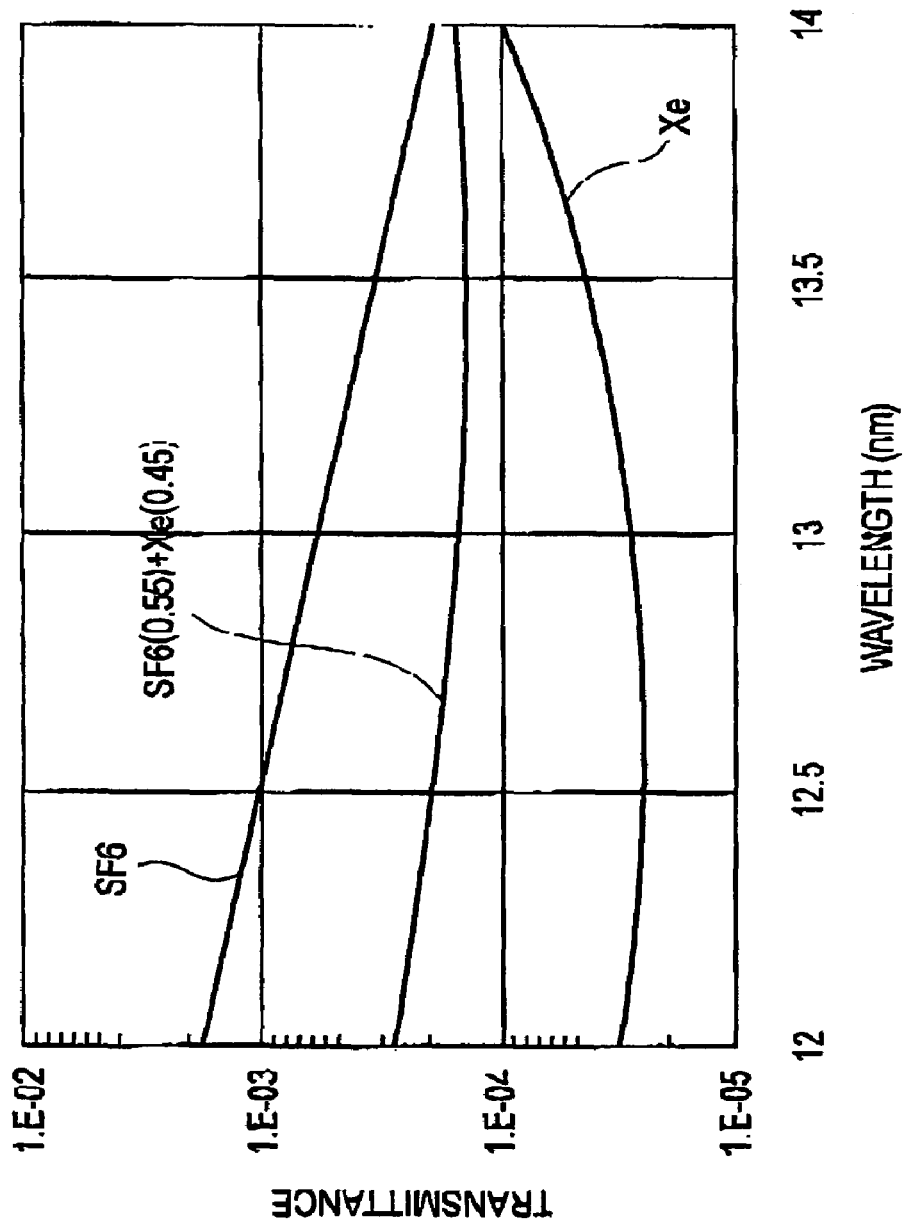
FIG. 6 is a graph for explaining transmittances of various gases with respect to lights of 12-14 nm.

A second embodiment of the present invention will be described with reference to an example wherein a mixture gas of Xe and $SF_6$ is used as a gas of the gas filter 7. FIG. 6 illustrates the transmittance of xenon Xe, sulfur hexafluoride $SF_6$ and a mixed gas of them (mixing ratio of $SF_6$:Xe is 0.55:0.45), with respect to light of wavelengths 12-14 nm. For all cases, the optical path length is 40 mm, and the pressure is 400 Pa. The wavelength is taken on the axis of abscissa, while the transmittance is taken on the axis of ordinate. It is seen from FIG. 6 that, for a single gas of Xe or $SF_6$, the transmittance varies in dependence upon the wavelength; whereas if a mixed gas of Xe and $SF_6$ is used, a gas filter having a transmittance being small in wavelength dependency can be provided. Although FIG. 6 shows the wavelength dependency of the transmittance in regard to a gas having a mixture ratio of 55% $SF_6$ vs. 45% Xe, a gas filter having approximately uniform transmittance within a range of 13 to 14 nm can be provided if a mixed gas that contains 40% to 60% Xe is used.

The gases usable as the mixed gas of the gas filter are not limited to Xe and $SF_6$. By using gases having positive and negative differential coefficients, respectively, to the wavelength, of the absorption coefficient in the wavelength region concerned at an appropriate density ratio, a gas filter with transmittance having small dependency upon the wavelength can be accomplished.

Embodiment 3

Figure 7:
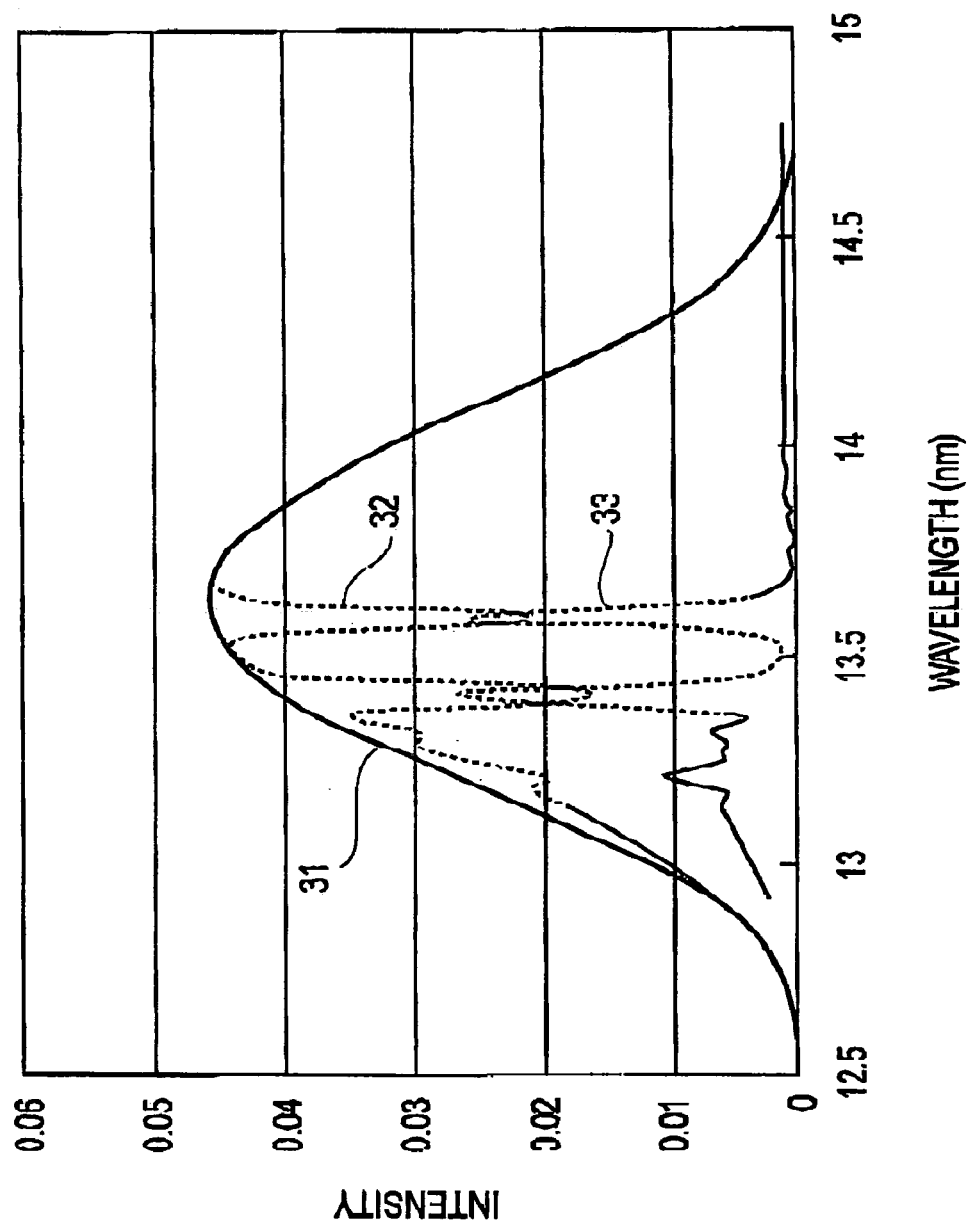
FIG. 7 is a graph for explaining the spectral intensity in a case where a gas containing Kr is used in a gas filter 7, relative to EUV light reflected by a Schwarzschild optics having multilayered film mirrors.

A third embodiment of the present invention will be described with reference to an example wherein a mixed gas of Xe and Kr is used as a gas for the gas filter 7. FIG. 7 shows the spectral intensity in a case where a gas which contains krypton Kr is used for the gas filter 7, in relation to EUV light being reflected by a Schwarzschild optics having multilayered film mirrors.

Where a Schwarzschild optics such as shown in FIG. 1 is used to image the EUV light, a multilayered film mirror is used as the reflection mirror. Since a multilayered film mirror has a characteristic for diffracting and reflecting light of a particular wavelength being incident with a particular incidence angle, into a particular direction, the light rays being reflected thereby have an intensity distribution having a peak at a predetermined design wavelength. However, regarding the EUV light having been reflected by the Schwarzschild optics wherein the number of layers of the multilayered film is made small to ensure uniform reflectance to the EUV light at any positions on the mirror as in the measuring apparatus of the present invention, as shown by spectral intensity curve 31 in FIG. 6 it has an intensity with relatively wide wavelength, with respect to a range from 13.365 nm to 13.635 nm practically usable in the exposure process. Because of this, there is a possibility that the result of measurement of the spatial distribution of the EUV light does not match the spatial distribution of EUV light actually used in the exposure process.

On the other hand, as depicted by an absorption curve 33, Kr has strong absorptions at opposite sides of 13.5 nm. Therefore, if Kr is used in the gas filter 7 in relation to EUV light having a spectral intensity 31, a spectral intensity shown at 32 having an enhanced portion around 13.5 nm is obtainable. Hence, information more pertinent to actual exposure wavelength can be provided.

Furthermore, as shown in FIG. 6, Xe has a relatively flat absorption characteristic in the neighborhood of 13.5 nm. Therefore, if a gas filter 7 having Kr and Xe, being effective to produce selective absorption such as described above, at respective partial pressures predetermined, is used, both the attenuation rate adjustment and the wavelength selection can be done at once. Particularly, a spatial distribution of the intensity of the wavelength about 13.5 nm actually to be in the exposure process can be produced. Although this embodiment uses a mixed gas of Kr and Xe, a mixture gas in which Kr is added to the mixture of Xe and $SF_6$ as used in the second embodiment, may be used.

Embodiment 4

Figure 8:
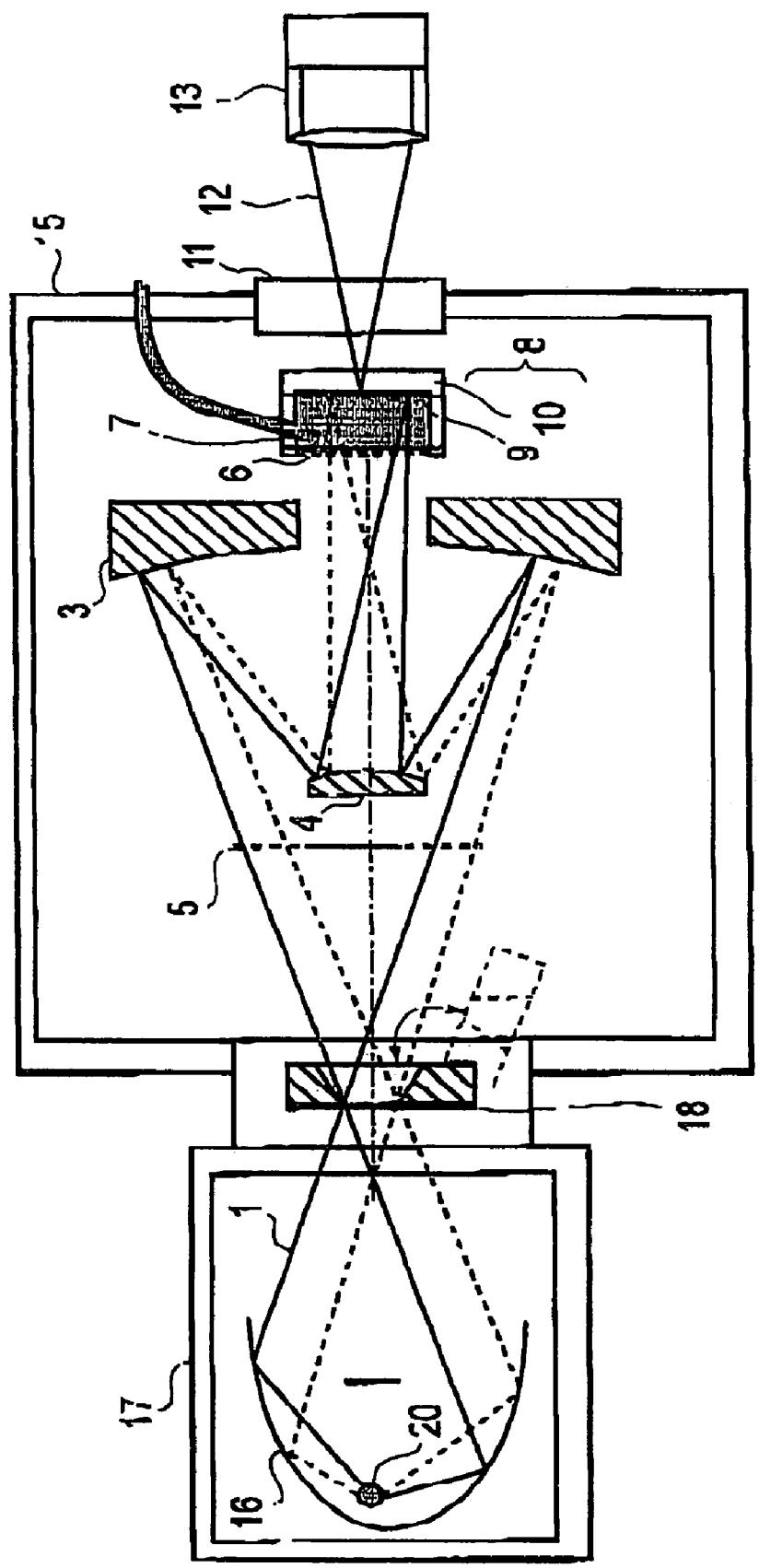
FIG. 8 is a schematic view of a measuring apparatus 14 according to a fourth embodiment of the present invention, for measuring a spatial distribution of a light convergent point of an EUV light source.
Figure 9:
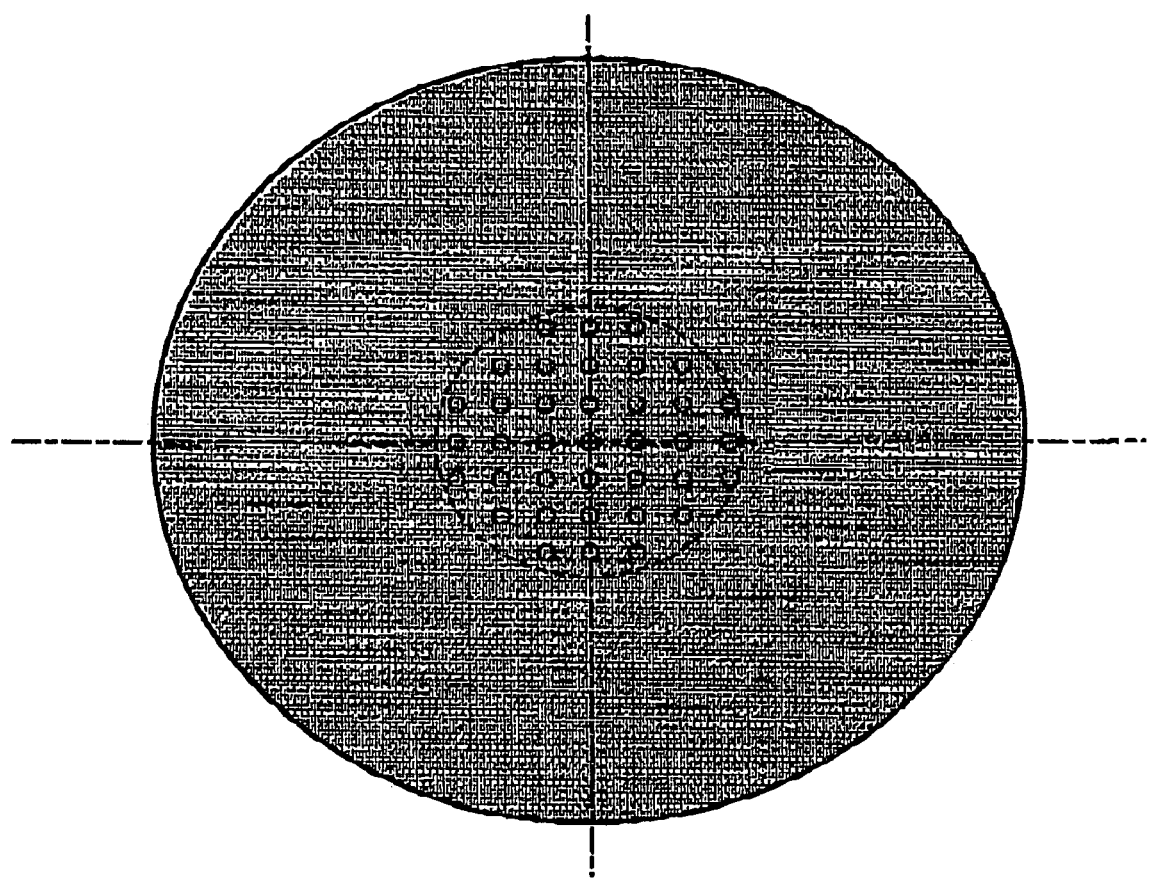
FIG. 9 shows gird-like pinholes 19 provided in a chart plate 18.

A fourth embodiment of the present invention will be described with reference to a method of improving the measurement precision in the measurement of a spatial distribution of the light convergent point 2 using a measuring apparatus 14 such as described hereinbefore. FIG. 8 shows a measuring apparatus according to this embodiment of the present invention, in which a tiltable chart plate 18 for calibration of measurement is provided at the position of the light convergent point 2. This chart plate 18 comprises a light blocking plate having openings, and it is demountably mountable on the light path. For calibration of measurement, it is mounted on the light path. FIG. 9 illustrates grid-like openings (pinholes) 19 which are formed in the chart plate 18.

A method of measuring the spatial distribution of the light convergent point 2 with good precision, by use of the chart plate 18, will now be described.

First, the light source is actuated to emit light, while the chart plate 18 is held placed on the optical axis to enable the light beam 1 to pass through the pinhole 19 and is imaged on the screen 8. Then, the position of the image of the pinhole 19 is detected. Here, from the relationship between the actual position of the pinhole 19 and the position of the image of the pinhole 19 formed on the screen 8, overall image distortion throughout the imaging optical system and the CCD optical system can be detected.

Subsequently, the chart plate 18 is demounted out of the optical axis, and an image of the light convergent point 2 is imaged on the screen in the manner as has been described with reference to the first embodiment, and the spatial distribution of the light convergent point is measured. Here, by taking into account the optical distortion from the light convergent point to the screen 8 having been detected as described above, the image of the light convergent point can be detected very accurately.

Hence, any distortion of the image caused in the measurement procedure can be corrected in the manner described above. Thus, even if thermal deformation, for example, of the imaging optical system occurs during the measurement, the image of the light convergent point can be detected accurately and correctly.

Figure 10:
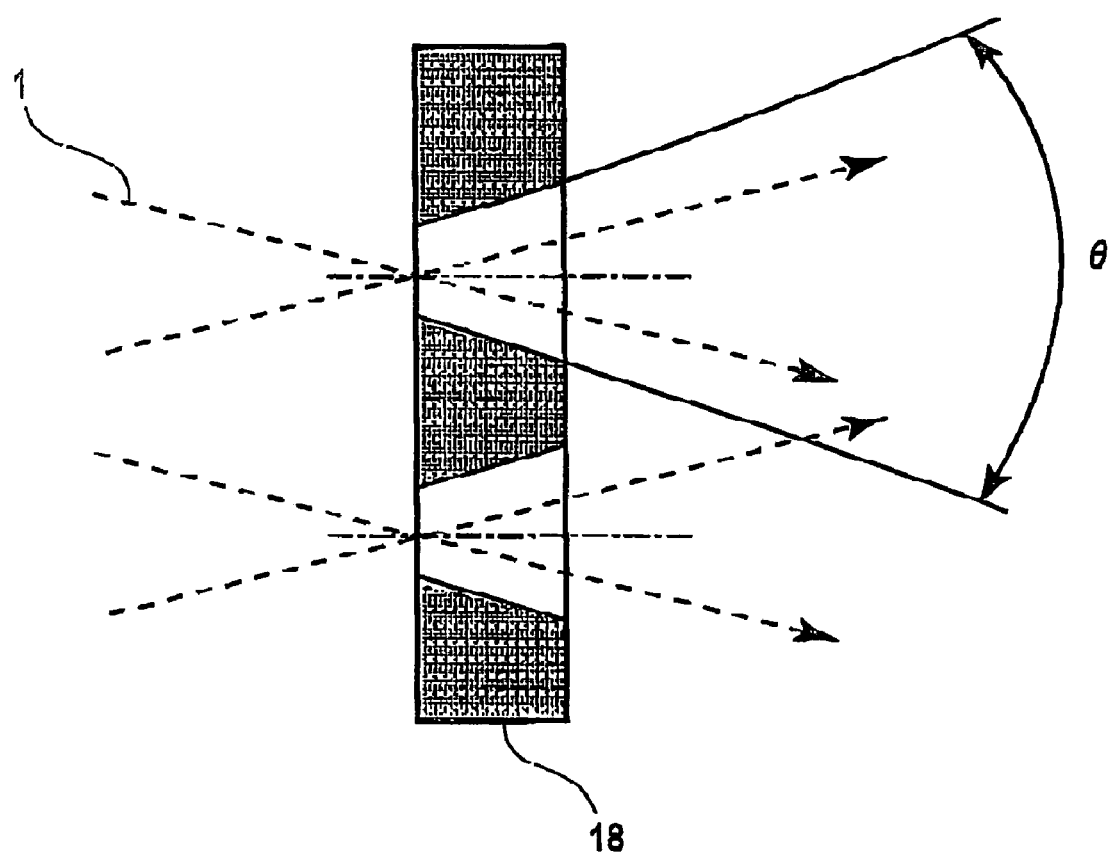
FIG. 10 is a sectional view, illustrating the sectional structure of the pinholes 19 of FIG. 9.
Figure 11:
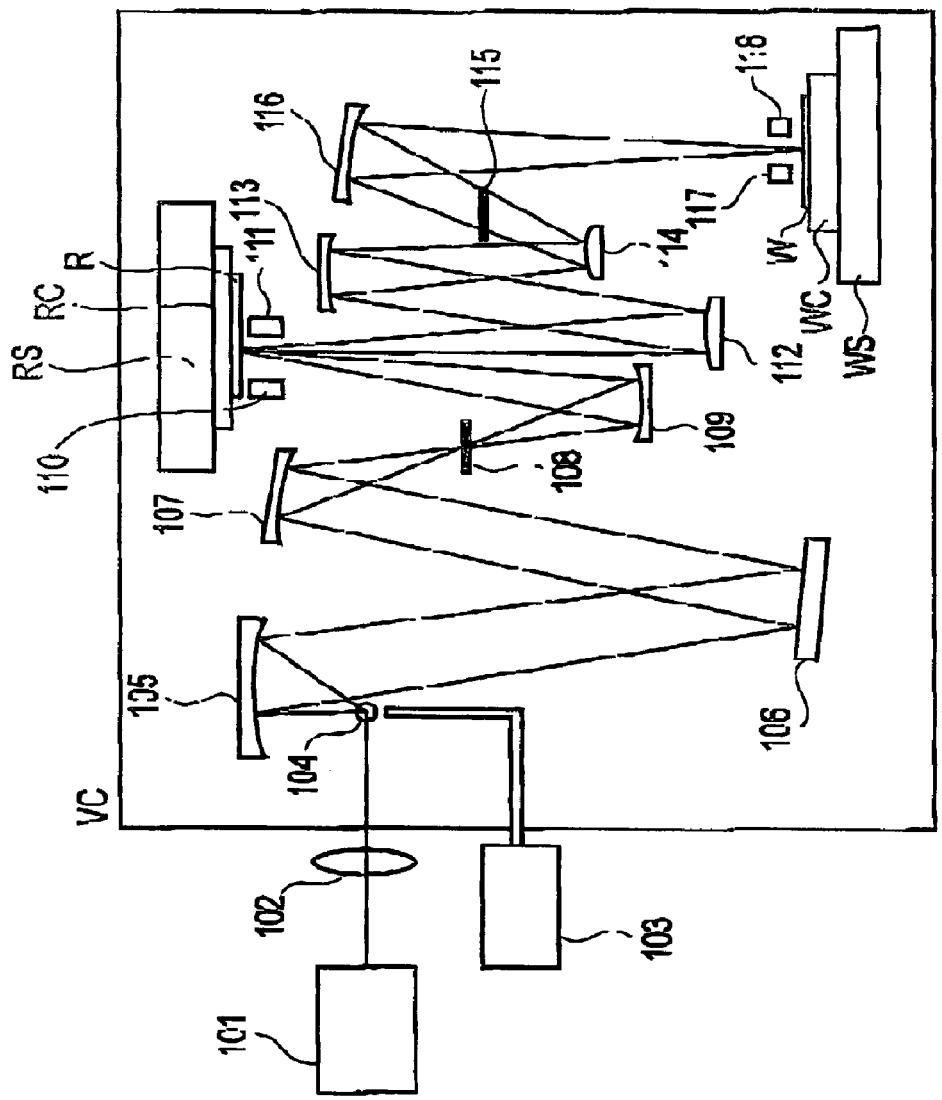
FIG. 11 is a schematic view of an EUV exposure apparatus.

The chart plate 18 may preferably be provided at the light convergence (collection) position of the light collecting mirror 16. If the chart plate 18 has a thickness to certain extent, the surface thereof at the light entrance side may preferably be set at the light convergence position, while the sectional structure of the pinholes 19 may preferably be made such as shown in FIG. 10, wherein it has a shape extending with a predetermined angle or more along the optical axis direction. Here, the extending angle θ of the pinhole 19 can be given by relation (6) below, if the angle of the light source which is the object of measurement is NA.

$$\theta > 2 \cdot \arcsin(NA) \quad (6)$$

It is to be noted here that the openings to be formed in the chart plate 18 are not limited to pinholes. Slits or the like may be used.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2004-078588 filed Mar. 18, 2004, for which is hereby incorporated by reference.

What is claimed is:

1. A measuring apparatus, comprising:
light receiving means for receiving EUV light diverging from a light convergent point;
an optical system for directing the EUV light toward said light receiving means;
a first light blocking member disposed at a pupil plane of said optical system and having a plurality of openings;
a second light blocking member having an opening and being detachably mountable at the position of the light convergence point: and
means for detecting a spatial distribution of the EUV light at the light convergent point, on the basis of reception of EUV light by said light receiving means.

2. An apparatus according to claim 1, wherein, when L is the distance between the light convergent point and the openings, λ is the wavelength of light to be measured, and R is a desired resolving power, the size d of the openings of the first light blocking member satisfies a relation d>1.22·λ·L/R.

3. An apparatus according to claim 1, wherein, when L is the distance between the light convergent point and the openings, λ is the wavelength of light to be measured, and D is a diameter of the light convergent point, the size d of the openings of the first light blocking member satisfies a relation d>6.1·λ·L/D.

4. An apparatus according to claim 1, wherein said second light blocking member has a thickness in an optical axis direction and wherein the opening of said second light blocking member has extension from an incidence direction of the EUV light to an exit direction thereof, with a predetermined angle.

5. A measuring apparatus, comprising:
light receiving means for receiving EUV light diverging from a light convergent point;
a gas filter disposed in a portion of a light path of the EUV light and being filled with a predetermined gas; and
means for detecting a spatial distribution of the EUV light at the light convergent point, on the basis of the reception of EUV light by said light receiving means.

6. An apparatus according to claim 5, wherein the gas is a mixed gas comprising mixture of gases having positive and negative differential coefficients, to wavelength, of an absorption coefficient with respect to light of a predetermined wavelength.

7. An apparatus according to claim 5, wherein the gas consists of at least one of xenon Xe, sulfur hexafluoride $SF_6$, krypton Kr, and mixture of them.

8. An apparatus according to claim 5, further comprising a light blocking member having an opening and being detachably mountable at the position of the light convergence point.

9. An apparatus according to claim 8, wherein said light blocking member has a thickness in an optical axis direction and wherein the opening of said second light blocking member has extension from an incidence direction of the EUV light to an exit direction thereof, with a predetermined angle.

* * * * *